United States Patent
Martinschitz et al.

(10) Patent No.: US 9,067,363 B2
(45) Date of Patent: Jun. 30, 2015

(54) METHOD AND DEVICE FOR PERMANENT BONDING OF WAFERS, AS WELL AS CUTTING TOOL

(75) Inventors: Klaus Martinschitz, Schärding (AT); Markus Wimplinger, Ried im Innkreis (AT); Bernhard Rebhan, Haag a. H. (AT)

(73) Assignee: EV Group E. Thallner GmbH (AT)

( * ) Notice: Subject to any disclaimer, the term of this patent is extended or adjusted under 35 U.S.C. 154(b) by 185 days.

(21) Appl. No.: 13/808,415

(22) PCT Filed: Jan. 23, 2012

(86) PCT No.: PCT/EP2012/050974
§ 371 (c)(1),
(2), (4) Date: Jan. 4, 2013

(87) PCT Pub. No.: WO2013/110315
PCT Pub. Date: Aug. 1, 2013

(65) Prior Publication Data
US 2014/0196842 A1    Jul. 17, 2014

(51) Int. Cl.
*B23K 20/22*    (2006.01)
*B23K 20/24*    (2006.01)
(Continued)

(52) U.S. Cl.
CPC ........... *B29C 65/74* (2013.01); *Y10T 156/1062* (2015.01); *Y10T 156/12* (2015.01);
(Continued)

(58) Field of Classification Search
CPC ...... B23K 20/22; B23K 20/023; B23K 20/24; Y10T 156/1062; Y10T 156/12

USPC ............... 156/153, 256, 308.2; 29/428, 33 K, 29/281.5; 428/615
See application file for complete search history.

(56) References Cited

U.S. PATENT DOCUMENTS

| | | | |
|---|---|---|---|
| 4,499,156 A | 2/1985 | Smith et al. | 428/614 |
| 4,969,593 A | 11/1990 | Kennedy et al. | 228/193 |

(Continued)

FOREIGN PATENT DOCUMENTS

| | | | |
|---|---|---|---|
| EP | 0 780 187 A1 | 6/1997 | B23K 15/00 |
| EP | 1 643 011 A1 | 4/2006 | C23C 30/00 |

(Continued)

OTHER PUBLICATIONS

Int'l Search Report from corresponding PCT/EP2012/050974 (Form PCT/ISA/210); 4 pages.

(Continued)

*Primary Examiner* — Linda L Gray
(74) *Attorney, Agent, or Firm* — Kusner & Jaffe

(57) ABSTRACT

A method for bonding a first bond surface of a first solid substrate consisting of a first material to a second bond surface of a second solid substrate consisting of a second material. The method including the steps of: working one of the first and/or second bond surfaces with a cutting tool at a speed $v_s$ that is below a critical speed $v_k$ and at a temperature $T_s$ that exceeds a critical temperature $T_k$, down to a surface roughness O that is less than 1 µm; bringing the first solid substrate into contact with the second solid substrate at the bond surfaces, and exposing the solid substrates that are in contact to temperature in order to form a permanent bond that is at least primarily produced by recrystallization at the bond surfaces.

11 Claims, 4 Drawing Sheets

(51) Int. Cl.
*B29C 65/74* (2006.01)
*B23K 20/02* (2006.01)

(52) U.S. Cl.
CPC ............ *B29C65/7412* (2013.01); *B23K 20/22* (2013.01); *B23K 20/023* (2013.01); *B23K 20/24* (2013.01); *B23K 2201/40* (2013.01)

(56) References Cited

U.S. PATENT DOCUMENTS 5,812,925 A * 9/1998 Ecer .............................. 428/548
6,143,587 A 11/2000 Omizo .......................... 438/106

FOREIGN PATENT DOCUMENTS

| | | | | |
|---|---|---|---|---|
| GB | 1087304 | | 10/1967 | ............. B23K 19/00 |
| JP | S63277704 A | | 11/1988 | ................ B22F 3/24 |
| JP | 406256968 | * | 9/1994 | ............. C23C 22/73 |
| JP | 2000343240 A | | 12/2000 | ............. B23K 20/00 |
| JP | 2010149180 A | | 7/2010 | ............. B23K 20/00 |
| RU | 1810275 | * | 4/1993 | ............. B24B 39/00 |
| SU | 931244 | * | 5/1982 | |

OTHER PUBLICATIONS

Office Action issued in the corresponding Japanese Patent Application No. 2013-554827, dated Apr. 28, 2014.

* cited by examiner

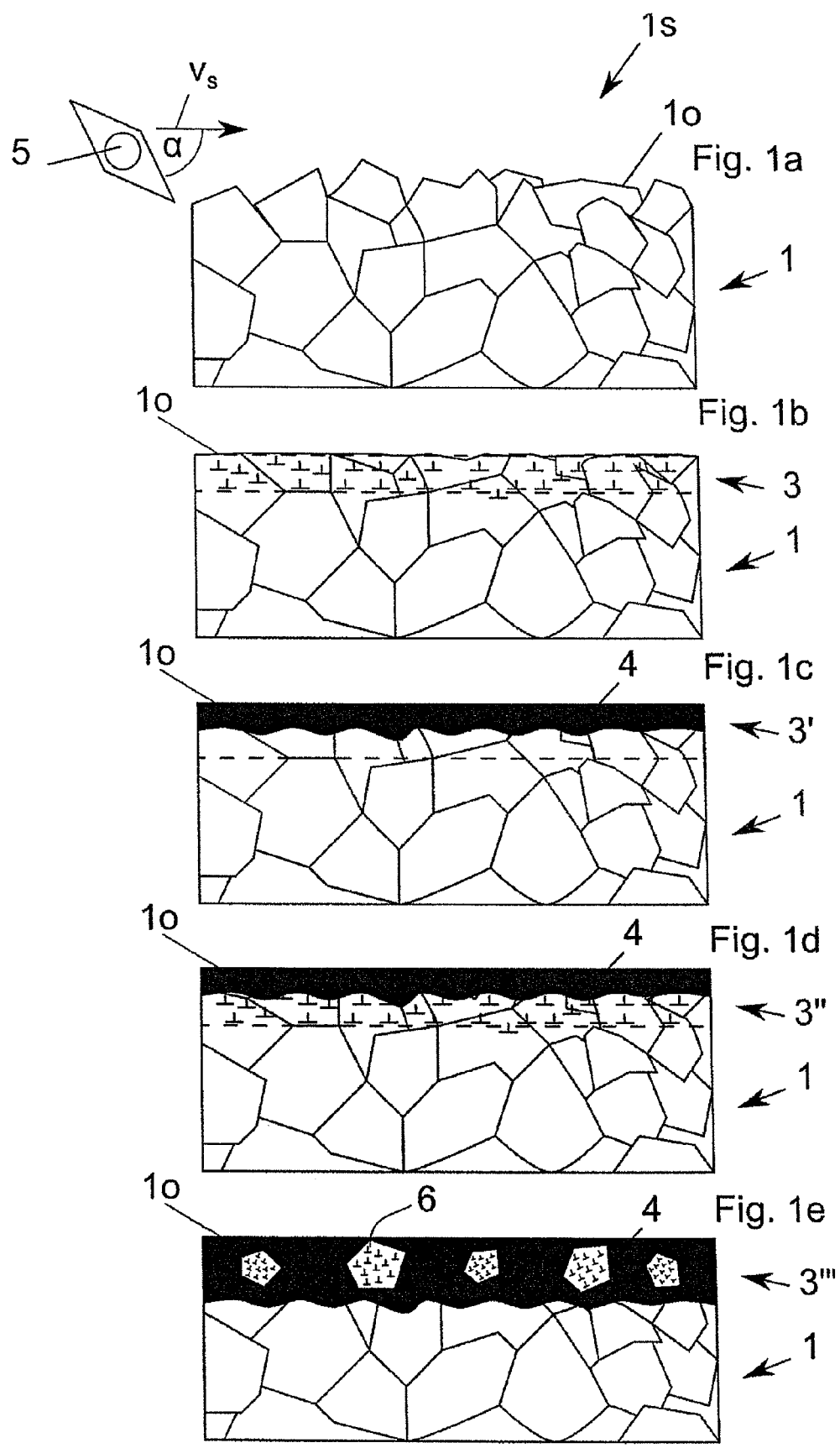

METHOD AND DEVICE FOR PERMANENT BONDING OF WAFERS, AS WELL AS CUTTING TOOL

FIELD OF THE INVENTION

This invention pertains to a method for bonding a first bond surface of a first solid substrate that consists of a first material to a second bond surface of a second solid substrate that consists of a second material, as well as a cutting tool.

BACKGROUND OF THE INVENTION

The purpose of permanent or irreversible bonding of solid substrates is to produce as strong a bond as possible and especially an irreversible bond, i.e., a high bonding force between the two contact surfaces of the solid substrates. For this purpose there exist in the prior art various approaches and production methods, especially the welding of the bond or the creation of a diffusion bond between the surfaces at elevated temperatures.

All kinds of materials, but primarily metals and/or ceramics, are permanently bonded. One of the most important permanent bonding systems is a metal-metal system. In recent years Cu—Cu systems have been the primary systems gaining in popularity. The development of 3-D structures specifically requires in most cases the joining of different functional layers. This joining being done more and more often using so-called TSVs (Through Silicon Vias). Ensuring contact between these TSVs is very often done by means of copper contact points. At the time of the bonding, full-fledged, functional structures, for example, microchips, are very often already present at one or more surfaces of the solid substrates. Since different materials with different thermal expansion coefficients are used in the microchips, a rise in temperature during bonding is not desirable. Such an elevation of temperature can lead to thermal expansion and thus to thermal stresses that can destroy the parts of the microchip or its vicinity.

The known production methods and approaches taken thus far frequently lead to unreproducible or poorly reproducible results that especially can hardly be transferred to different conditions. In particular, production methods that are currently being used often employ high temperatures, i.e., temperatures above >400° C., to guarantee reproducible results.

Technical problems such as high energy consumption and possible destruction of the structures that are present on the solid substrates result from the high temperatures that have been required to date for a high bonding force.

Other requirements for a bonding process are:
Front-end-of-line compatibility.
This is defined as the compatibility of the process during the production of the electrically active components. The bonding process must therefore be designed in such a way that active components such as transistors that are already present on the structural wafers are not compromised or damaged during processing. The compatibility criteria primarily includes purity of certain chemical elements (primarily the CMOS structures) and mechanical loading capacity, especially for loads arising from thermal stresses.
Low contamination.
No application of force, or application of as little force as possible.
Lowest possible temperature, especially in the case of materials with different thermal expansion coefficients.

Against this backdrop there has long existed a need to create a direct, permanent connection between two metal surfaces under conditions of the lowest possible temperatures and pressures/forces. A direct permanent connection is preferably defined by one skilled in the art as the production of a completely new structure over the boundary surface between two metal surfaces that are in contact.

In this case the formation of a new structure is preferably done by recrystallization. Recrystallization is defined as the production of a new structure by means of grain growth. The prerequisites for such grain growth include high degrees of deformation that increase the dislocation density of a material and thus bring the material into an energetically metastable state; when a critical temperature is exceeded, this leads to new grain formation. In heavy industry, massive transformation processes such as rolling, forging, deep drawing, twisting, shearing, etc. are primarily used to achieve high degrees of dislocation.

Such massive transformation processes, with which the above-mentioned metastable dislocation-rich microstructure can be created at low temperature, cannot be used in the semiconductor industry because of the very thin substrates with extremely fine structures and the thin, fragile wafers. Neither the structures nor the wafers can or should be subjected to massive transformation since they will be destroyed thereby.

SUMMARY OF THE INVENTION

The present invention provides a method and a device/a cutting tool, with which the bonding of two solid substrates can be done in a manner that is more gentle and more effective for the substrates and any structures on the substrates.

Advantages of the present invention are achieved with the features of the claim 1, 7, and 9. Advantageous developments to the invention are indicated in the dependent claims. The invention also includes all combinations comprising at least two features indicated in the specification, the claims, and/or the figures. In the case of the value ranges indicated, values lying within the limits presented are also to be regarded as disclosed as boundary values and can be claimed in any combination.

The basic idea of this invention is to planarize at least one of the two bond surfaces and preferably both bond surfaces before they are brought into contact, in such a way that the surface roughness O of the bond surface(s) is minimized in order to weld together/bond the base surfaces optimally after they are brought into contact. In this connection, provision is especially made for eliminating chemical-mechanical polishing (CMP) processes. Moreover, according to the invention, a metastable microstructure is produced at the bond surface in order to obtain a high displacement density and/or an amorphous layer at the bond surface. The high displacement density and/or the amorphous layer promotes and/or accelerates the recrystallization process. In this process a smooth surface is provided in particular (reduction of surface roughness).

In addition, near-surface amorphous areas are provided in order to ensure better bonding of the two surfaces. The production of amorphous materials in industry is mainly done by vapor deposition of a material onto cooled substrates, by shooting ions or irradiation, by extremely powerful mechanical deformation, etc. The invention disclosed here discloses a way of creating already existing near-surface areas with high displacement densities and/or amorphous areas.

The planarization and production of the metastable structure are preferably done by means of a cutting method.

Solid substrates made of the following materials are suitable as solid substrates according to the invention:

Cu—Fe, Cu—Ge, Cu—In, Cu—Li, Cu—Mg, Cu—Mn, Cu—Nb, Cu—Nd, Cu—Ni, Cu—Si, Cu—Sn, Cu—Zn, Cu—Zr, Cu—Ti, Cu—W, Cu—Ti, Cu—Ta, Cu—Au, Cu—Al, Cu—Cu

W—Fe, W—Ge, W—In, W—Li, W—Mg, W—Mn, W—Nb, W—Nd, W—Ni, W—Si, W—Sn, W—Zn, W—Zr, W—Ti, W—Ti, W—Ta, W—Au, W—Al

Ti—Fe, Ti—Ge, Ti—In, Ti—Li, Ti—Mg, Ti—Mn, Ti—Nb, Ti—Nd, Ti—Ni, Ti—Si, Ti—Sn, Ti—Zn, Ti—Zr, Ti—Ta, Ti—Au, Ti—Al

Ta—Fe, Ta—Ge, Ta—In, Ta—Li, Ta—Mg, Ta—Mn, Ta—Nb, Ta—Nd, Ta—Ni, Ta—Si, Ta—Sn, Ta—Zn, Ta—Zr, Ta—Ti, Ta—W, Ta—Ti, Ta—Ta, Ta—Au, Ta—Al

Au—Fe, Au—Ge, Au—In, Au—Li, Au—Mg, Au—Mn, Au—Nb, Au—Nd, Au—Ni, Au—Si, Au—Sn, Au—Zn, Au—Zr, Au—Ti, Au—W, Au—Ti, Au—Au, Au—Au, Au—Al

Al—Fe, Al—Ge, Al—In, Al—Li, Al—Mg, Al—Mn, Al—Nb, Al—Nd, Al—Ni, Al—Si, Al—Sn, Al—Zn, Al—Zr, Al—Ti, Al—W, Al—Ti, Al—Al, Al—Al, Al—Al

The following mixed forms of semiconductors are also conceivable as solid substrates:

III-V: GaP, GaAs, InP, InSb, InAs, GaSb, GaN, AlN, InN, $Al_xGa_{1-x}As$, $In_xGa_{1-x}N$

IV-IV: SiC, SiGe,

III-VI: InAlP.

non-linear optics: $LiNbO_3$, $LiTaO_3$, KDP ($KH_2PO_4$)

solar cells: CdS, CdSe, CdTe, $CuInSe_2$, $CuInGaSe_2$, $CuInS_2$, $CuInGaS_2$ conductive oxides: $In_{2-x}SnxO_{3-y}$ In order to explain the application of the idea of the invention to structures in the micro-range and/or the nano-range, an explanation will first be given of general physical, chemical, and materials-science principles. When the term tool is used hereinafter, said term generally refers to a tool that is capable of striking a workpiece with a speed v at a certain temperature T. This means impact stress on the workpiece. The tool is preferably a standardized tool, for example, a Charpy notched-bar impact testing machine (DIN EN 10045-1). The workpiece is preferably a standard sample. FIGS. 3a and 3b schematically depict the effect of tool speed (FIG. 3a) and temperature (FIG. 3b) on cleavage fracture strength ($T_f$) and ductile fracture strength ($G_f$) in the case of bulk metals. The diagrams are schematic representations of these two physical properties. Since the numerical values differ for different materials, no absolute numerical values are given. In FIG. 3a the dependency of the cleavage fracture strength and ductile fracture strength of the material is presented as function of tool speed.

Cleavage fracture strength $T_f$ is the resistance that the material puts up against a force that attempts to sever the material without plastic deformation, i.e., in an ideal brittle manner. Ductile fracture strength $G_f$ is the resistance that the material puts up against a force, more specifically a thrust force, that attempts to deform the material plastically. The mechanisms of plastic deformation in this case are primarily the mechanical plastification mechanisms of dislocation motion and dislocation production and the formation of crystallographic twins. The distinction between cleavage fracture strength and ductile fracture strength cannot be made completely based on the material. Thus, it is entirely possible for even ductile materials to exhibit brittle fracture behavior if they have embedded intermetallic phases or if unfavorable stresses conditions prevail because of the sample geometry. Moreover, the impact conditions of tools and sample temperature play decisive roles. FIGS. 3a and 3b show schematic plots of cleavage fracture strength and ductile fracture strength as a function of temperature and tool speed for metals. In FIG. 3a it is clear that at low tool speeds below a critical speed $v_k$ which is empirically determined in each case for the material, (especially with allowance for thickness), ductile fracture strength $G_f$ has lower values than cleavage fracture strength $T_f$. Accordingly, at tool speeds below the critical speed $v_k$ the material will fracture more readily by deformation fracture (i.e., ductile fracture) than by cleavage fracture. Above the critical speed $v_k$, the values for cleavage fracture strength $T_f$ lie below those for ductile fracture strength $G_f$. Tools that strike the material at speeds above the critical speed $v_k$ will cause the material to fracture in a brittle manner, i.e., by cleavage fracture. From FIG. 3a it is clear that ductile fracture strength $G_f$ is heavily dependent on tool speed $v_k$, while cleavage fracture strength $T_f$ varies hardly at all with tool speed. Cleavage fracture strength and ductile fracture strength additionally depend on the temperature of the material (FIG. 3b). At temperatures above the critical temperature $T_k$ material failure occurs primarily due to ductile fracture, while, by contrast, below the critical temperature $T_k$ material failure occurs primarily due to brittle fracture (i.e., cleavage fracture). According to the invention, "freezing" of the dislocations thus takes place at low temperatures. Dislocation motion as a material-physical process is explicitly dependent on temperature. The lower the temperature, the lower the dislocation mobility and the more difficult it will be to move the dislocations of the solid substrates. FIGS. 3a and 3b show that in general a metal fractures in a more brittle manner, the higher the tool speed and the lower the temperature. In order to categorize different materials according to their fracture behavior, the experimentally determined notched-bar impact work K that it takes to fracture the material is plotted as a function of temperature (FIG. 3c). In this way a notched bar impact work-temperature diagram is obtained which, depending on the material in question, has an explicit drop-off in notched-bar impact work (2) or whose notched-bar impact work varies only slightly over the temperature range (1 or 3). Materials with the curve plot (1) require a very large notched-bar impact work over the entire temperature range and are fractured mainly by deformation fracture. The higher notched-bar impact work is due to the fact that a great deal of energy goes into generating and moving dislocations. Materials with the curve plot (3) require a very small amount of notched-bar impact work over the entire temperature range and are mainly fractured by cleavage fractures. The low notched-bar impact energy is the result of the fact that any crack that is formed or is present has to muster only the energy that it takes to grow, i.e., the bonding energy between the atoms. In contrast to deformation fracture, no energy is expended for the formation and/or movement of dislocations. Therefore the notched-bar impact energy is lower. Moreover, there are materials whose notched-bar impact energy has a curve plot (3). This curve plot exhibits a clear transition from deformation fracture to cleavage fracture as temperature decreases. In the case of materials with this physical property, the fracture behavior can accordingly be explicitly influenced by temperature variation.

It should be mentioned here that the notched-bar impact work of materials such as Al, Cu, Ni, or austenitic steels (generally primarily materials with face-centered cubic lattices) is described by curve (1). The fracture behavior of body-centered cubic materials is primarily described by curve (2). High-strength materials, glass, and ceramic exhibit mainly the behavior described by curve (3). One skilled in the art is familiar with all these properties from the physics of materials, or more specifically from the group of bulk materials. All properties of bulk materials that are disclosed here and are familiar to one skilled in the art are now to be exploited, on the one hand, to planarize the surface of structures already located on a wafer and, on the other, to bring the near-surface area into a metastable state that promotes and/or accelerates bonding to other surfaces of other structures.

In order for recrystallization to occur, according to the invention two conditions are to be met cumulatively.

First, a highly deformed metal has to be heated to above the recrystallization temperature. Tin, for example, recrystallizes at approximately 0° C., zinc at approximately 20° C., aluminum at approximately 100° C., copper at approximately 270° C., iron at approximately 450° C., and tungsten at approximately 1200° C. In general it must be assumed that the actual recrystallization temperatures will lie above or below these values. A decisive factor for recrystallization temperature is contamination by alloying additives. Thus, for example, the recrystallization temperature of 99.999% copper lies at 120° C., but the recrystallization temperature of electrolytically deposited copper, which by nature is rather impure, lies at approximately 200° C. The deposition of copper by electrolysis is always associated with organic additives, ions, and impurities. Copper deposited by CVD and/or PVD processes is, by contrast, of high purity.

The second condition for recrystallization is an energetically metastable state. According to the invention, this state is produced by a high dislocation density and/or an amorphous-crystalline structure and/or a quasi-crystalline structure. An amorphous matrix is preferably provided in which partially crystalline phases and/or quasi-crystalline phases are present, most preferably microcrystals and/or nanocrystals with a high dislocation density. Any combination of crystals, quasi-crystals, and amorphous structural components in any volume ratio is also conceivable. In order to make the rest of the text clearer, crystalline-amorphous structures will be primarily addressed.

It is known that so-called "size effects" can radically alter the physical-chemical behavior of materials. The recrystallization of copper, especially for very small dimensions, can take place even below the above-mentioned minimum recrystallization temperature of 120° C. Thus, high-purity materials with microstructures or nanostructures whose surfaces are worked by high speed tools at the temperatures provided produce, according to the invention, more efficient recrystallization at lower temperatures than do corresponding bulk materials.

According to the invention, it especially advantageous if, as soon as possible after a first working (and optionally a second working), especially within two hours, preferably within 30 minutes, even more preferably within 10 minutes, and ideally within 5 minutes, the solid substrates are brought into contact. This measure ensures that any undesired reactions such as oxidation of the functional layer or the surfaces of the solid substrates are minimized.

The bond surfaces according to the invention are worked to a surface roughness O with a quadratic roughness ($R_q$) of less than 1 μm, preferably less than 100 nm, most preferably less than 10 nm, and even more especially less than 1 nm. These empirical values are determined by Atomic Force Microscopy (AFM).

Another aspect of the invention consists of the formation of a seamless transition between the two solid substrates to be bonded. A seamless transition is defined as a polycrystalline structure that extends, with no interruption in the grain structure, from one side of the bonded wafer to the other. The creation of such a seamless transition is done especially by recrystallization under the conditions of the above-described parameters that are empirically related in particular to the materials of the solid substrates and their dimensions. Recrystallization is the formation of a new structure caused by a high dislocation density and a temperature which has been empirically determined according to the invention by grain growth. Because of the high dislocation density provided for according to the invention, the structure is in a metastable state. This metastable state is created by overlapping strain fields of the dislocations. Below the recrystallization temperature thermal motion is not sufficient to cause the dislocations of the dislocation network to begin sliding by themselves due to the mutually repelling strain fields. The dislocations are quasi-"frozen". If the temperature exceeds the recrystallization temperature, thermal motion is sufficient to reduce the dislocation density by means of dislocation motion. A complete reformation of the structure is associated with the reduction in dislocation density. The effect achieved according to the invention consists in the fact that the reformation of the structure takes place beyond the bond interface (which is defined/limited by the surface roughness O) and so causes the interface to disappear virtually completely.

Accordingly, a method according to the invention has, especially in its most general form, the following steps, especially in the following sequence, for bonding a first bond surface of a first solid surface consisting of a first material to a second bond surface of a second solid substrate consisting of a second material:

working of the first and/or second bond surfaces with a cutting tool to create a metastable structure in at least the area close to the surface and, especially at a speed $v_s$ that lies below a critical speed $v_k$ and a temperature $T_s$ that lies above a critical temperature $T_k$ and preferably with simultaneous or subsequent planarization to a quadratic roughness ($R_q$) of less than 1 μm, preferably less than 100 nm, most preferably less than 10 nm, and most especially less than 1 nm, bringing the first solid substrate and the second solid substrate into contact at the bond surfaces, and exposing the solid substrates in contact to temperature in order to form a permanent bond, created at least primarily by recrystallization, at the bond surfaces in each case down to a recrystallization depth R that is greater than the surface roughness O of the bond surfaces with a bond temperature $T_B$ that exceeds the recrystallization temperature.

A corresponding device according to the invention has, especially in its most general embodiment, the following features:

a cutting tool to work the first and/or second bond surfaces to create a metastable structure in at least the area near the surface, especially at a speed $v_s$ that lies below a critical speed $v_k$ and a temperature $T_s$ that lies above a critical temperature $T_k$ and does so down to surface roughness O of less than 1 μm, preferably less than 100 nm, most preferably less than 10 nm, and most especially less than 1 nm, means for bringing the first solid substrate into contact with the second solid substrate at the bond surfaces, and means for exposing the solid substrates in contact to temperature, for the purpose of forming a permanent bond created at least primarily by recrystallization at the bond surfaces in each case down to a recrystallization depth R that is greater than the surface roughness O of the bond surfaces with a bond temperature $T_B$ that exceeds the recrystallization temperature.

A cutting tool according to the invention is designed for working the first and/or second bond surface at a speed $v_s$ that lies below the critical speed $v_k$ and a temperature $T_s$ that lies above a critical temperature $T_k$ and does so down to a surface roughness O of less than 1 μm, preferably less than 100 nm, most preferably less than 10 nm, and most especially less than 1 nm.

An advantageous embodiment of this invention calls for the first and second materials to be selected to be identical. This promotes recrystallization.

Another embodiment according to the invention calls for the first and/or the second material to be metal. This invention is especially suitable for metallic materials so that optimum results can be obtained with them.

To the extent that the formation of the permanent bond takes place at a bond temperature $T_B$ that exceeds the critical temperature $T_k$, the formation of the permanent bond is accelerated.

Another advantageous embodiment calls for the working with the cutting tool to be done in such a way that at the first and/or second bond surface an amorphous layer and/or a layer of elevated dislocation density is formed. The parameters of working speed and temperature are in this case especially dependent on the materials of the solid substrates and their dimensions, especially their thickness. Suitable parameters can be empirically determined, especially specific to the material.

In another embodiment, it is advantageously provided that, after the first working and before contact is made, a second working of the first and/or second bond surfaces is done with a cutting tool, especially the same tool, at a speed $v_o$ that lies above the critical speed $v_k$ and a temperature $T_s$ that lies below a critical temperature $T_k$ and does so to reduce surface roughness O to less than 100 nm, preferably less than 10 nm, more preferably less than 1 nm, and most especially less than 0.1 nm. This ensures that, after the microstructure is created (first working), surface roughness O is reduced, especially by cleavage fracture. If the surface roughness has already been reduced enough by the first working, this process step is not necessary.

In principle, a distinction is made between two kinds of cleavage fracture: intercrystalline cleavage fracture and transcrystalline cleavage fracture (very often the literature also refers to cleavage fracture as brittle fracture). In the case of intercrystalline cleavage fracture, the crack runs along the grain boundaries of a grain. In the case of transcrystalline cleavage fracture, the crack runs transversely through the grain. If it should emerge from the empirical data that the material is fracturing due to intercrystalline fracture, resulting in an unfavorable surface roughness, i.e., a high surface roughness, then the parameters according to the invention have to be modified in such a way that surface roughness is minimized. Contrary to the invention that is explicitly disclosed here, this state can also very easily result from ductile fracture alone. It should be mentioned, however, that the microstructure of the materials used has grains preferably in the nanometer range, and therefore even in the case of intercrystalline cleavage fracture there will be roughness only in the nanometer range. In particular, the (mean) grain diameter will then be the upper boundary for this (mean) roughness. If the structure should have grains in the micrometer range, then in any case transcrystalline cleavage fracture is desired. Mention should be made here, for example, but not on exclusive basis, of intergranular precipitations, intermetallic phases within the grain, oriented microstructure elements that can deflect cracks, etc. In general, it can be stated that a grain will fracture preferably along the grain boundary when the strength between the grains is less than that of the atoms within a grain.

The invention therefore relates to a method by which the recrystallization of a material (the material of the solid substrates) is carried out at comparatively low temperature in the near-surface areas of the bond surface through the creation of a metastable energy state in the structure. In this way two bond surfaces that are brought into contact with one another are permanently and seamlessly joined to one another with a comparatively very low surface roughness O. A metastable energy state is preferably created only in near-surface areas of the bond surfaces. Here a cutting tool, consisting especially of multiple tools, is used that is/are capable of establishing a certain microstructure at the bond surface by means of frequency, cutting speed, tool geometry, and/or cutting edge insertion angle. In this case it is especially advantageous, according to the invention, if the tool parameters and ambient parameters are selected in such a way that the area near the surface and the bond surfaces have an elevated dislocation density after the tool passes through.

After recrystallization, the structure is preferably as coarse-grained as possible. A course-grained structure has very low thermal resistance and, in particular, very low electrical resistance. Thus, such coarse-grained structures, which are preferably even monocrystalline over the interface, are especially suitable for electrically conductive connections. Since the industry will use the method according to the invention preferably, but not exclusively, for the production of interconnects, as electrically conductive connections, as low an electrical resistance as possible and thus as coarse-grained a structure as possible are desired in most cases. For components that are interconnected by the method according to the invention and are intended to have only a mechanically stabilizing effect, in particular a thermo-mechanically stabilizing effect, then on the contrary a fine-grained structure is preferred since such a structure has a higher fatigue strength, especially in the presence of alternating thermal loads.

In an advantageous embodiment of the invention, the tool parameters and environmental parameters are selected in such a way that, after the first working, i.e., after the tool passes, the bond surface and the area near the surface consist of an amorphous layer in which crystalline areas are provided that preferably have a very high dislocation density. The thickness of the amorphous layer is determined in particular by the (empirically established) tool speed.

Another, elementary aspect of the invention is the recrystallization beyond the contact plane/beyond the near-surface layer of contact (in particular, in the area of surface roughness O). According to the invention, this is achieved and optimized by setting the surface roughness O to be comparatively low, namely by means of the working with the cutting tool. By adjusting the speed of the tool and the temperature in a targeted manner, surface roughness O can be minimized. In the case of most materials, the minimum surface roughness O is associated with a high tool speed and a low temperature since cleavage-fracture surfaces are smoother than surfaces that have undergone a plastic deformation process. While from the standpoint of physics the lower surface roughness does not change anything with regard to crystallization, i.e., the modification of the structure, the lower surface roughness does allow the newly formed grains to bridge the contact plane more easily since there are more contact points owing to the lower surface roughness.

The recrystallization temperatures are dependent on the material used for the solid substrates, and this is especially dependent on the dislocation density of the material. For the purposes of this specification, 50% of the melting point of the material is adopted as the recrystallization temperature (homologous temperature of 0.5). According to the invention it is conceivable to influence the recrystallization temperature through the targeted addition of additives, especially alloying elements, or targeted contamination, and preferably to use high-purity metals to reduce it to a minimum.

The empirical determination of material-specific parameters can be done especially by notched-bar impact strength measurement on bulk materials. Furthermore, the empirical determination of parameters according to the invention can be done by means of the actual execution and by means of test series with the device according to the invention. This is especially preferred because the transfer of standard values of bulk materials for the parameters according to the invention to thin substrates is not easily possible, at least not directly.

Moreover, according to the invention it is advantageous in one embodiment of the invention to carry out the step of working of the first and/or second bond surfaces in a first module, while the step of bringing them into contact, aligning them, and temperature exposure of the solid substrates that are in contact is done in a separate, second module (physically separate from the first module).

By way of example, but not limiting, FIG. 4 shows in sketch and greatly simplified form a top view of a possible tool holder with cutting tools. The tool holder rotates around its axis and is pushed by a forward feed over the wafer to be worked. One skilled in the art is best acquainted with these kinds of tools or tools that work in a similar fashion.

According to the invention, a sample holder is provided that can be appropriately actively heated and/or cooled in order to bring the wafer to be worked to the desired temperature. It is also disclosed that the two wafers can/must be aligned with respect to one another after the treatment process according to the invention.

Additional advantages, features, and particulars of the invention are given in the following description of preferred example embodiments as well as in the drawings. Here:

BRIEF DESCRIPTION OF THE DRAWINGS

FIG. 1a shows a process step according to the invention for working a solid substrate with a cutting tool according to the invention;

FIG. 1b shows a bond surface worked according to the invention with a near-surface layer that has an elevated dislocation density;

FIG. 1c shows a bond surface worked according to the invention with a near-surface amorphous layer;

FIG. 1d shows a bond surface worked according to the invention with a near-surface amorphous layer that has an elevated dislocation density;

FIG. 1e shows a bond surface worked according to the invention with a near-surface amorphous layer with crystalline areas that have an elevated dislocation density;

DETAILED DESCRIPTION OF PREFERRED EMBODIMENTS

Figure 2A:
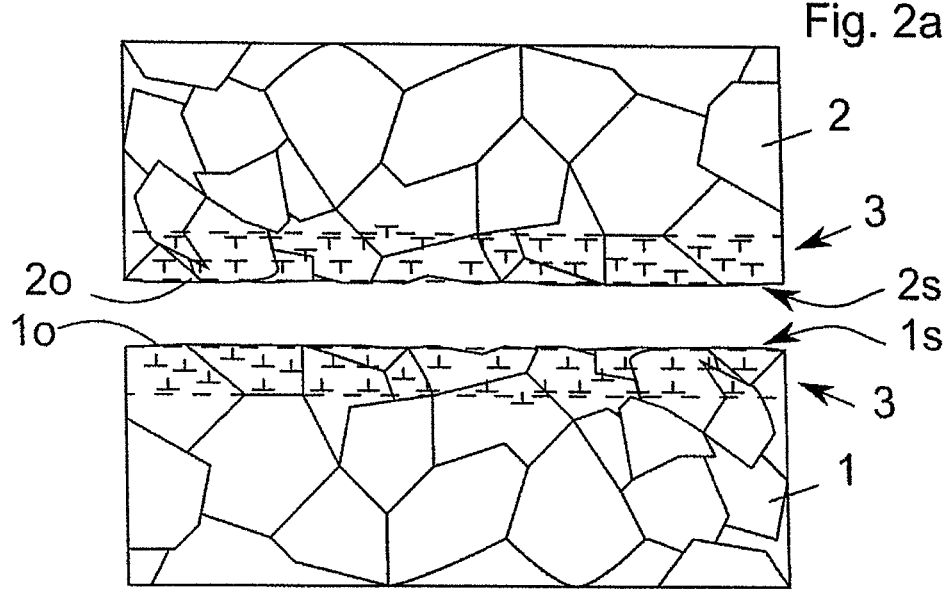
FIG. 2a shows a process step of the working of a first and a second bond surface similar to FIG. 1b according to the invention.
Figure 2B:
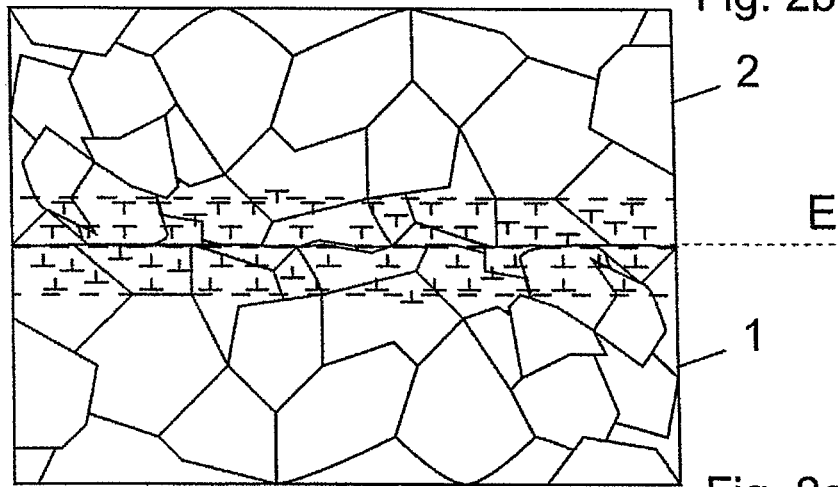
FIG. 2b shows a process step according to the invention for bringing the solid substrates into contact.
Figure 2C:
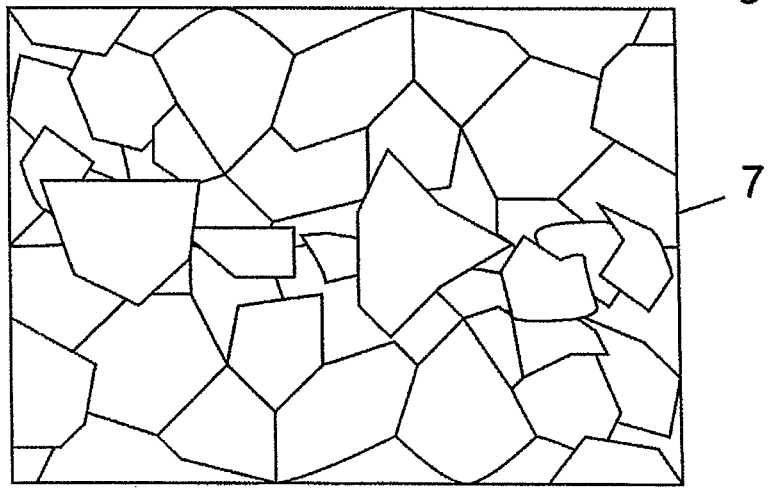
FIG. 2c shows a process step according to the invention for temperature exposure of the solid substrates that are in contact for the purpose of forming at the bond surfaces a permanent bond that is at least primarily created by crystallization.

FIG. 1a shows a first solid substrate 1 that consists of a first material (in this case metal) and that on a bond side 1s has a comparatively high surface roughness O (mean quadratic roughness relative to the overall bond side is and a bond surface 1o, to be bonded, of the bond side is of the first solid substrate 1). FIGS. 1a to 1e and FIGS. 2a to 2c show in each case only small area cross-sections of the first solid substrate 1 and a second solid substrate 2 (FIGS. 2a to 2c).

For a first step for working of a first bond surface 1o, a cutting tool 5 is provided that can move with a speed $v_s$ along the first bond surface 10 in such a way that material is removed at the first bond surface 1o. The relative speed $v_s$ of the cutting tool 5 as well as the temperature $T_s$ during the first working have a significant effect on material removal. In addition, other factors of influence are the shape of the cutting tool 5 (tool geometry), the temperature of the tool itself, and a cutting edge insertion angle α with respect to the direction of motion (speed vector $v_s$) of the cutting tool 5.

According to the invention, the above-mentioned parameters are set in such a way (especially by empirical determination of the above-mentioned parameters) that, after the first working and optionally after at least a second working of the bond surface 1o, a near-surface area 3 (FIG. 1b), 3' (FIG. 1c), 3" (FIG. 1d), or 3'" (FIG. 1e) is formed.

In the embodiment shown in FIG. 1b, the above-mentioned parameters are selected in such a way that, after the first working with the cutting tool 5, the near-surface area 3 has a dislocation density that is elevated compared to the first material of the solid substrate 1 in accordance with FIG. 1a.

In the embodiment shown in FIG. 1c, the above-mentioned parameters are selected in such a way that, after the first working with the cutting tool 5, the near-surface area 3' consists at least partially, and preferably primarily, of an amorphous material 4 which, especially in certain areas, is completely amorphous.

In the embodiment shown in FIG. 1d, the above-mentioned parameters are selected in such a way that, after the first working with the cutting tool 5, the near-surface area 3" consists at least partially, and preferably primarily, of an amorphous material 4 which, especially in certain areas, is completely amorphous and, especially in the area outside of the amorphous material, has a dislocation density that is elevated relative to the first solid substrate 1 before the first working.

In the embodiment shown in FIG. 1e, the above-mentioned parameters are selected in such a way that, after the first working with the cutting tool 5, the near-surface area 3'" is formed at least partially, and preferably primarily, of an at least partially and especially completely amorphous material 4 in which crystalline areas 6, especially having an elevated dislocation density, are formed.

Figure 3A:
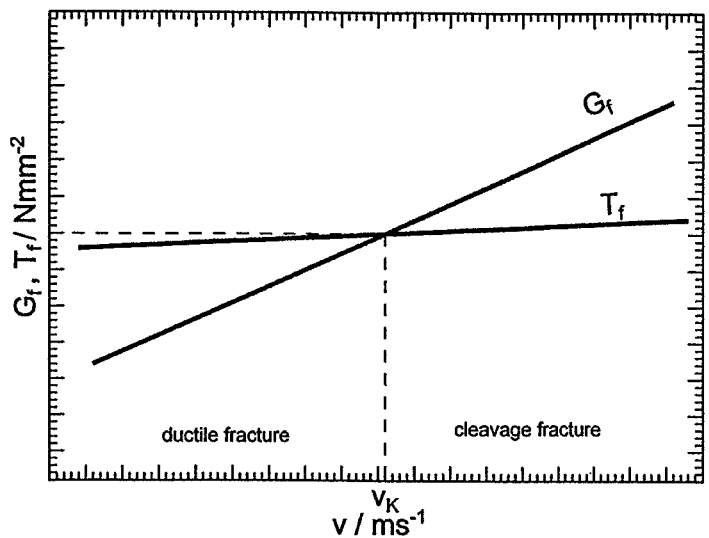
FIG. 3a shows a diagram of the dependency of cleavage-fracture strength and ductile-fracture strength on the speed of the tool.
Figure 3B:
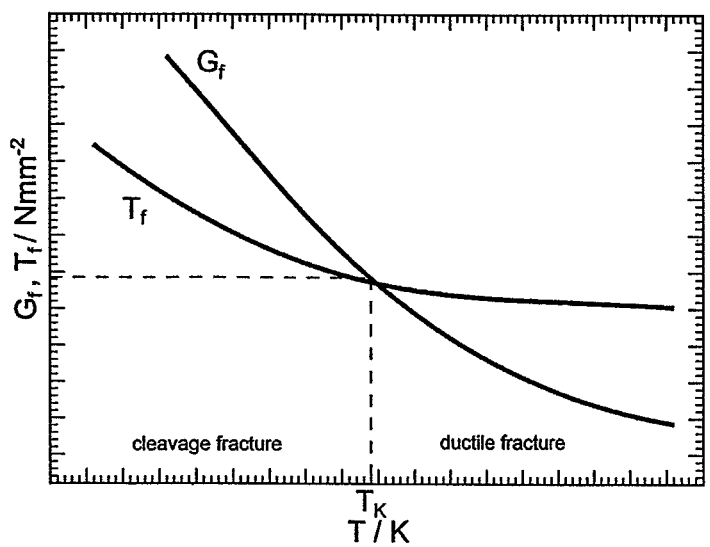
FIG. 3b shows a diagram of the dependency of cleavage-fracture strength and ductile-fracture strength on temperature.
Figure 3C:
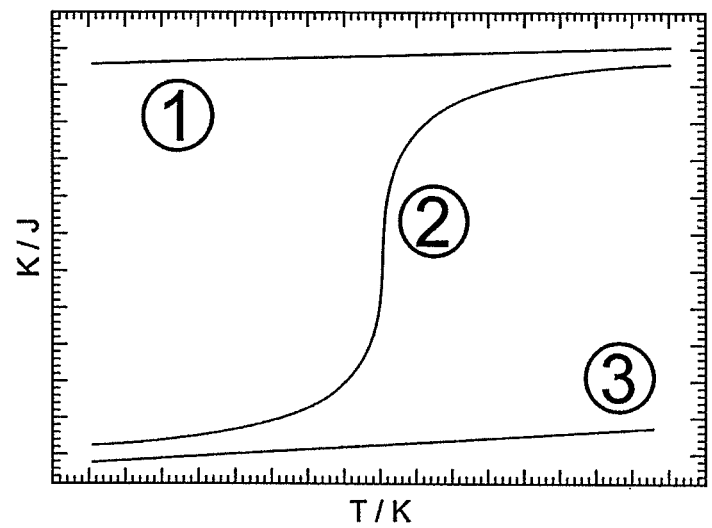
FIG. 3c shows a diagram of the dependency of notched-bar impact work on temperature for three typical classes of materials.
Figure 4:
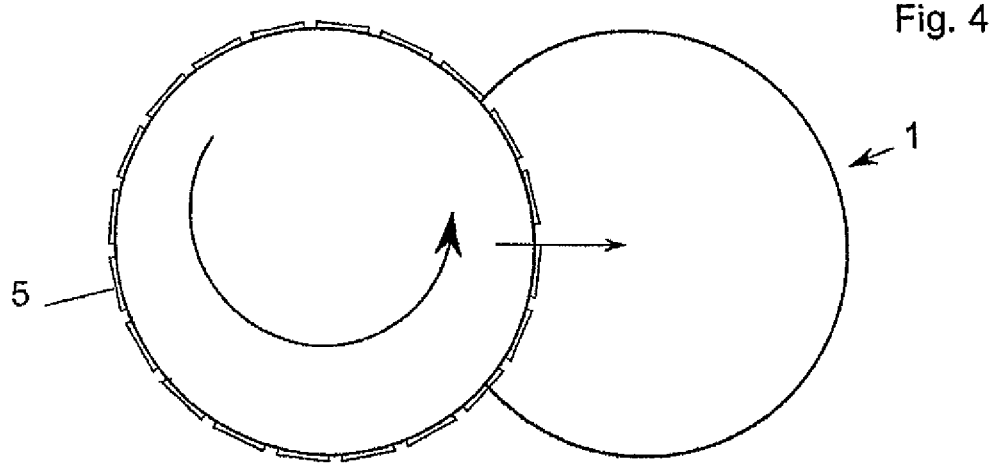
FIG. 4 shows a possible embodiment of the metal-cutting tool.

According to the invention, it is conceivable to modify the above-mentioned parameters for the above-mentioned embodiments during the first working and/or to provide additional working steps in order to produce the above-mentioned features. In any case, the cutting tool 5 operates at least primarily and preferably completely with a speed $v_s$ that is below the critical speed $v_k$ according to FIG. 3a so that the material is primarily removed by means of deformation fracture. At the same time the temperature during the first working lies at least primarily and preferably completely above the critical temperature $T_k$ in accordance with FIG. 3b so that deformation fracture is also promoted thereby.

If after this first working step the necessary planarity has not yet been achieved, the necessary planarity can be achieved by means of at least one additional working step. In the second working step, the cutting tool 5 preferably has a speed $v_s$ that lies above the critical speed $v_k$ according to FIG. 3a so that the material is primarily removed by means of cleavage fracture. At the same time the temperature during the first working lies at least primarily and preferably completely below the critical temperature $T_k$ in accordance with FIG. 3b so that cleavage fracture is also promoted thereby.

The thickness of the layer consisting of amorphous material 4 is determined in particular by the tool speed $v_s$, which is material-specific and can be empirically determined as a function of material temperature.

In accordance with the invention, in the embodiment according to FIGS. 1b to 1e not only is a change in the material of the near-surface areas 3, 3', 3", 3''' brought about, but also in particular there is a significant reduction in surface roughness O by a factor of at least 5, especially by a factor of at least 10, and preferably by a factor of at least 20, so that the surface roughness O is less than 1 μm, especially less than 100 nm, preferably less than 10 nm, even more preferably less than 1 nm, and most preferably less than 0.1 nm.

By means of the combination of the above-mentioned measures and the corresponding working of the second solid substrate 2 on its bond side 2s to create a similar bond surface 2o after the first working and optionally by means of additional working steps, the first solid substrate 1 and the second solid substrate 2 are, as FIG. 2a shows, oriented with respect to one another in such a way that the bond side is and the bond side 2s are arranged facing one another.

In the process step shown in FIG. 2b, the first solid substrate 1 is brought into contact with the second solid substrate 2 at the bond surfaces 1o, 2o (contact plane E). Because of the considerably reduced surface roughness O of the two solid substrates 1, 2, the distance between the solid substrates 1, 2 is extremely small, thus promoting recrystallization of the first material of the first solid substrate 1 with a second material of the second solid substrate 2. Moreover, and in combination therewith, recrystallization is promoted by the invention-specific formation of the near-surface area 3, 3', 3", 3''', so that after a recrystallization time, especially with exposure to temperature, a permanent bond is created down to a recrystallization depth R that is greater than the surface roughness O and that is greater in particular than the depth of the near-surface area 3, 3', 3", 3'''. A solid substrate 7 that is bonded in accordance with the invention is shown in FIG. 2c, in which, because of the measures according to the invention, the bond surfaces 1o, 2o are no longer recognizable and in particular also no more amorphous material 4 is present.

Having described the invention, the following is claimed:

1. Method for bonding a first bond surface of a first solid substrate consisting of a first material to a second bond surface of a second solid substrate consisting of a second material, said method comprising the steps of:
   working one of a first bond surface and a second bond surface with a cutting tool to create a metastable structure in at least a near-surface area and to produce a reduced surface roughness O of less than 100 nm,
   bringing the first solid substrate into contact with the second solid substrate at the bond surfaces, and
   exposing the solid substrates that are in contact to a temperature sufficient to form a permanent bond, said permanent bond being at least primarily produced by recrystallization at the bond surfaces down to a recrystallization depth R that is greater than the surface roughness O of the bond surfaces with a bond temperature $T_B$ that exceeds the recrystallization temperature.

2. Method in accordance with claim 1, in which the first and second materials are identical.

3. Method in accordance with claim 1, in which the first and/or second materials are metals.

4. Method in accordance with claim 1, 2 or 3 wherein the formation of the permanent bond takes place at a bond temperature $T_B$ that is greater than a critical temperature $T_k$.

5. Method in accordance with claim 1, 2 or 3 wherein the working with the cutting tool is done in such a way that an amorphous layer and/or a layer of elevated dislocation density is formed at the first and/or second bond surface.

6. Method in accordance with claim 1, 2 or 3 wherein after the first working is done and before contact is made, a second working of said one of the first and second bond surfaces with a second tool is carried out at a speed $v_o$ that exceeds a critical speed $v_k$ and at a temperature $T_o$ that is below a critical temperature $T_k$ in order to reduce the surface roughness O to less than 100 nm.

7. Method in accordance with claim 1, wherein said working step produces a reduced surface roughness of less than 10 nm.

8. Method in accordance with claim 1, wherein said working step produces a reduced surface roughness of less than 1 nm.

9. Method in accordance with claim 1, wherein said working step produces a reduced surface roughness of less than 0.1 nm.

10. Device for bonding a first bond surface of a first solid substrate consisting of a first material to a second bond surface of a second solid substrate consisting of a second material, said device comprising:
    a cutting tool for working one of the first and the second bond surfaces to create a metastable structure in at least a near-surface area and a reduced surface roughness of less than 100 nm, and
    a sample holder for receiving at least one of the first and the second solid substrates, the sample holder configured to heat and/or cool the solid substrates(s) to a predetermined temperature after the substrate(s) are in contact to form a permanent bond that is at least primarily produced by recrystallization at the bond surfaces down to a recrystallization depth R that exceeds the surface roughness O of the bond surfaces with a bond temperature $T_B$ that is greater than a recrystallization temperature.

11. Device in accordance with claim 10, in which the cutting tool can be adjusted in such a way that a second working is carried out at a speed $v_o$ that exceeds a critical speed $v_k$ at a temperature $T_o$ that is below a critical temperature $T_k$, in order to reduce the surface roughness O to less than 100 nm.

* * * * *